United States Patent
Chen et al.

(10) Patent No.: US 7,895,386 B2
(45) Date of Patent: Feb. 22, 2011

(54) USB INTERFACE PROVIDED WITH HOST/DEVICE FUNCTION AND ITS CONTROL METHOD

(75) Inventors: Po-Ching Chen, Jhubei (TW); Yun-Kuo Lee, Hukou Township, Hsinchu County (TW)

(73) Assignee: Prolific Technology Inc., Taipei (TW)

( * ) Notice: Subject to any disclaimer, the term of this patent is extended or adjusted under 35 U.S.C. 154(b) by 0 days.

(21) Appl. No.: 11/657,575

(22) Filed: Jan. 25, 2007

(65) Prior Publication Data

US 2007/0180181 A1 Aug. 2, 2007

(30) Foreign Application Priority Data

Jan. 27, 2006 (TW) ................ 95103232 A

(51) Int. Cl.
*G06F 13/00* (2006.01)
(52) U.S. Cl. ...................... 710/313; 710/104
(58) Field of Classification Search ................ 710/313, 710/107, 100, 300, 104
See application file for complete search history.

(56) References Cited

U.S. PATENT DOCUMENTS

| | | | |
|---|---|---|---|
| 6,804,727 B1 * | 10/2004 | Rademacher | 710/9 |
| 7,038,665 B1 * | 5/2006 | Pandana | 345/168 |
| 2003/0041205 A1 * | 2/2003 | Wu et al. | 710/302 |
| 2004/0019732 A1 * | 1/2004 | Overtoom et al. | 710/313 |
| 2005/0182883 A1 * | 8/2005 | Overtoom | 710/305 |
| 2007/0255885 A1 * | 11/2007 | Bohm et al. | 710/316 |
| 2008/0005262 A1 * | 1/2008 | Wurzburg et al. | 709/217 |

OTHER PUBLICATIONS

"USB On-The-Go Basics"; Maxim Integrated Products Application Note 1822; Maxim Integrated Products; Dec. 20, 2002; accessible via <http://www.maxim-ic.com/an1822>.*
"USB On-The-Go: A Tutorial"; Philips Semiconductors; Koninklijke Philips Electronics N.V.; Jan. 2002.*
On-The-Go Supplement to the USB 2.0 Specification; Revision 1.0a; Section 6, pp. 50-68; Jun. 24, 2003.*

* cited by examiner

*Primary Examiner*—Glenn A Auve
(74) *Attorney, Agent, or Firm*—WPAT, PC; Justin King

(57) ABSTRACT

A USB interface provided with USB host/device function and its control method is disclosed. The USB interface includes a control unit, a USB host, a USB device, a memory, a port router and a plurality of connection ports. The control unit is used to define the connection ports to be either an upstream port or downstream port. It also controls signal flows within the USB control interface. The signal flows are provided for the USB host and the USB device. The memory is used to store data during the operation of the USB control interface. The USB host is coupled to an external device via the port router, and the USB device is coupled to an external host via the port router.

15 Claims, 7 Drawing Sheets

USB INTERFACE PROVIDED WITH HOST/DEVICE FUNCTION AND ITS CONTROL METHOD

FIELD OF THE INVENTION

The present invention relates to a multi-functional interface of Universal Serial Bus (USB) and the control method thereof, and more particularly to a USB interface with USB host/device function and the control method thereof.

BACKGROUND OF THE INVENTION

Universal Serial Bus (USB) specification was released in 1996. For solving the long-standing connecting issues between a computer system and its encompassing devices due to complex connecting specification, the USB specification provides a single-spec interface supporting the input/output requirements between the computer system and different kinds of external devices. The USB specification has been modified in several times to match the requirements in marketing and of the developers after USB 1.0 released. The modifications, in USB 1.1 released in 1998, add a new transfer type (interrupt OUT), and in USB 2.0 released in 2000, support a hi-speed specification, add a new interface specification, mini-B connector, and also define new descriptors. After that, On-The-Go (OTG) supplement to the USB 2.0 specification was released in 2001 to accomplish the purposes about better power management and possibilities of multi-role devices. In other word, OTG defines a host function that devices can implement to enable communicating with peripherals.

The main USB base, a host-device structure, is maintained during the period of USB evolution. Referring to FIG. 1 of the drawing, a physical bus topology diagram, disclosed in USB specification revision 2.0 released in 2000 by the USB Implementers Forum, is illustrated. According to FIG. 1, a USB system 100 is consisted of a host 110 and devices 120, wherein the host 110 is connected with the devices 120 by inter-connection. The devices 120 can be classified as three types: device, compound device and composite device.

In the specification of USB, several regular terms have specific meanings: a host, in charge of most controlling and communicating tasks in the USB system, includes a host controller and a root hub with one or more USB ports. A function is defined as a device that provides a capability to the host, such as a mouse or a keyboard. A hub includes one up stream port and at least one down stream port, wherein the up stream port is used for connecting with a host or other hub, and the down stream ports are used for connecting with embedded devices or peripherals. A device is a function, a hub or combinations thereof. Thus, in the host terminal, the compound device is defined as a hub and at least one physical device connected to the hub, and each of the physical device has its own address. For example, a keyboard function and a trackball function can be integrated as a compound device, wherein those functions were be connected to a hub. In viewpoints of the host, a compound device is exactly similar to a single hub connecting with other functions. As shown in FIG. 1, a compound hub is marked in the lower left block. Each of the compound hub and the devices has an independent address. A composite device is a functional device with a plurality of independent interfaces, wherein the interface is defined by means of the descriptor stored in the device. A composite device has only one address, but each of the interfaces has a unique function and is controlled independently. For instance, a composite device can have an interface for sound device as well as have the other interface for controlling panel.

The topology or arrangement of connections, on the USB bus, with six levels at most, is a tiered star. At the center of each star is a hub, and each lines of FIG. 1 is defined as a connection between a host and a hub/function, a hub and the other hub or a node. In the topology of USB disclosed in FIG. 1, each node is either a device or a function. When a USB system is enabled, the addresses of the devices in the USB system are assigned to 0. After that, the USB system requests state information from each device in a device-searching process and assigns addresses to the devices subsequently until each device has a unique address or until the numbers of connecting devices are reached the limitation of the USB system.

According to the above descriptions, it can be found that all data transmitting processes are controlled by the host, which means all other USB devices are slavers and must obey predetermined protocols to response the requests from the host so that the slavers are able to receive and transmit information with standard USB data format. Comparing with other peer to peer connecting structures, the USB system performs a host-device structure and accomplishes the control tasks over a plurality of devices only with one host.

On this account, instead of the complexity due to connections among several peripherals with different kinds of cables, such as RS232 serial-port or parallel interfaces, the USB structure utilizes only one type of transmitting cable to simplify the connecting complication between a host and peripherals, and has the advantages such as plug-and-play, hot attach and detach, low power consumption and low cost.

Because of the booming market of consumer electronics, especially to the portable device market, the USB specification must be modified to provide better abilities about power management and allowing peripherals to operate between two types of USB formats: host and device.

Therefore, USB Implementers Forum released the USB OTG 1.0, and then released USB OTG 1.0a in June 2003 to become a formal specification with practicability after six times modifications. Referring to FIG. 2 of the drawings, classes of the devices defined in USB OTG are illustrated. There are two types of devices, peripheral-only device (POD) and dual-role device (DRD) defined in USB OTG The POD device is similar to device defined above, and the DRD device comprises multiple functions of a USB host and a USB device. Thus, the DRD device must have a new function to switch between the host and the device function. For example, a cell phone can either connect to a host to be defined as a device or connect to a device to turn into a host driving the device.

As the supplement to the USB 2.0 specification, USB OTG as well defines five types of connector components: Mini-A plug, Mini-B plug, Mini-A receptacle, Mini-B receptacle, and Mini-AB receptacle. In the USB OTG specification, The A-device means the main device operating as a host, and generally relates to a DRD device operating in the host type. The b-Device means the slaver device operating as a device. The Mini-AB receptacle is a specification designed for the DRD device to allow both the Mini-A plug or the Mini-B plug to insert into this receptacle and defines the initial role (host or device) of the inserted DRD device to enable the host unit or the device unit therein by the types of the inserting plug. Mini-A receptacle is designed to be placed on a host to connect to an external Mini-A plug. In a parallel manner, the Mini-B receptacle is designed to be placed on a device to connect to an external Mini-B plug. Therefore, types (host or device) of USB equipments are distinguished via different receptacle types in the USB OTG specification.

In the USB OTG specification, a characteristic, compatible with host/device framework in the present USB specification, is that each of two connecting DRD devices can operate between host and device functions alternately. Similarly, hosts in the USB OTG specification are also in charge of the task to initialize data communication processes including bus-reset, descriptor-acquirement and addresses-assignment. After the these procedures, two OTG devices can transmit data by the way of standard transmitting protocols between a host and a device, wherein the exchange of host role between the two devices is defined by a host negotiation protocol (HNP).

In addition, an OTG device has only a connecting port used for connecting with a host terminal or a device terminal, which causes the OTG devices in short of expanding abilities and also limits the applications and market values of the OTG specification.

SUMMARY OF THE INVENTION

An object of the present invention is to provide a USB interface with host/device function and the control method thereof, driving a plurality of devices to set up an independent USB system.

Another object of the present invention is to provide a USB interface with host/device function and the control method thereof, connecting to a plurality of devices and an external host separately, wherein the external host can use the functions of the USB interface and the plurality of devices.

Another object of the present invention is to provide a USB interface with host/device function and the control method thereof, defined as a composite device on the condition that it is connected with an external host, wherein the USB interface bridges a plurality of devices and an external host defining the plurality of devices as the functions of the USB interface.

Another object of the present invention is to provide a USB interface with host/device function and the control method thereof, defined as a compound device on the condition that it is connected to an external host, wherein the USB interface bridges a plurality of devices and the external host defining the plurality of devices as the devices of the external host.

Another object of the present invention is to provide a USB interface with host/device function and the control method thereof, comprising a controlling unit, a router and a plurality of connecting ports, wherein the controlling unit defines each of the connecting ports as one of an up stream port and a down stream port.

Another object of the present invention is to provide a USB interface with host/device function and the control method thereof, comprising a control unit, a USB host unit, a USB device unit and a memory unit, wherein the control unit controls the data transmitting to the USB host unit and the USB device unit, and the memory unit stores the data when the USB interface executes data processing.

Another object of the present invention is to provide a USB interface with host/device function and the control method thereof, comprising a control unit, a router and a plurality of connecting ports, wherein the control unit defines functions of the connecting ports by the way that detecting whether an external equipment connected with any of the connecting ports supplies power to said USB interface through said connecting ports in which the connecting port connected with the external equipment supplying power to the USB interface is defined as an up stream port and the connecting port connected with the external equipment supplying no power to the USB interface is defined as an down stream port.

Another object of the present invention is to provide a USB interface with host/device function which is able to construct a USB apparatus with host/device function by means of embedding with a functional circuit.

Another object of the present invention is to provide a USB interface with host/device function by booking new functions upon connecting to the external host no matter if the external devices are connected or not for accomplishing the characteristic of hot plug in USB equipment by the way of pre-defining composite device function.

Another object of the present invention is to provide a USB interface with host/device function electronically simulating disconnecting and re-connecting processes to register new device function for accomplishing the characteristic of hot plug in USB equipment.

Another object of the present invention is to provide a USB interface with host/device function which employs port status change of hub in case of compound approach to inform the external host of recognizing the external devices for accomplishing the characteristic of hot plug.

Another object of the present invention is to provide a USB apparatus with host/device function driving a plurality of devices to set up an independent USB system when the USB apparatus connects with at least one external device, wherein the USB apparatus is defined as a composite/compound device and bridges the external device and an external host when the USB apparatus connects with at least one external device and the external host so that the external host is able to use the external devices without using any adding hub.

Another object of the present invention is to provide a control method of a USB interface with host/device function defining each of a plurality of connecting ports of the USB interface as one port selected from the set of an up stream port and a down stream port by detecting whether an external equipment connected with the connecting port supplies power to the USB interface.

Accordingly, in order to accomplish the one or some or all above objects, the present invention provides a USB interface with host/device function, comprising:

a plurality of connecting ports capable of connecting with said external equipment;

a control unit defining any of said plurality of connecting ports as one of a down stream port and an up stream port;

a host unit connected to said control unit and bridged to said down-stream port when one of said plurality of connecting ports are defined as said down stream port; and a device unit connected to said control unit and bridged to said up stream port when one of said plurality of connecting ports is defined as the up stream port wherein other of said plurality of connecting ports is defined as said down stream ports by said control unit.

The above and other objects, features and advantages of the present invention will become apparent from the following detailed description taken with the accompanying drawings.

DETAILED DESCRIPTION OF THE PREFERRED EMBODIMENTS

Figure 1:
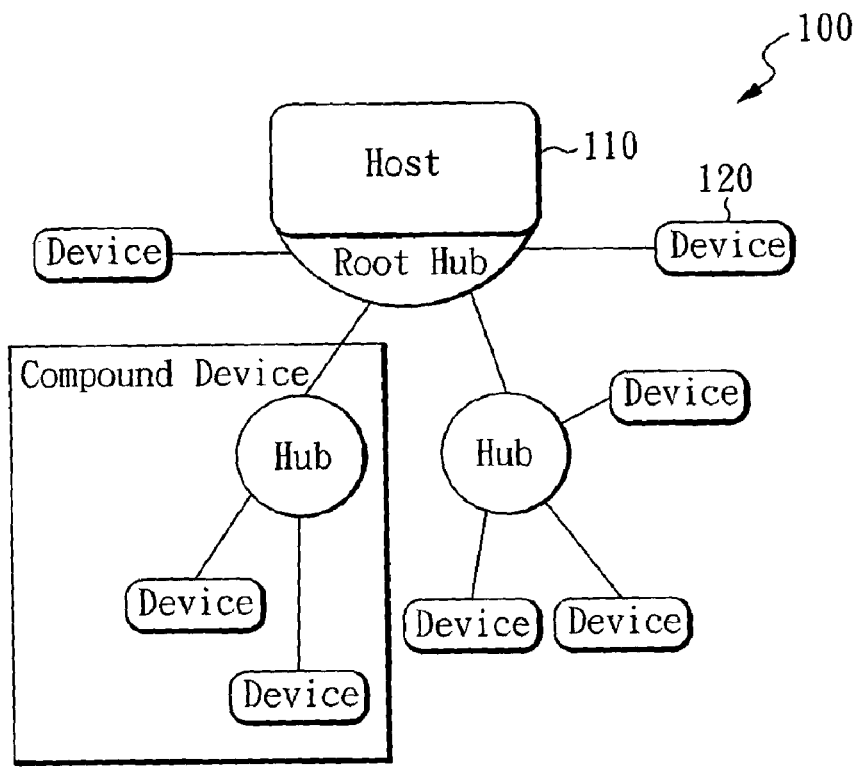
FIG. 1 is a Physical Bus Topology diagram disclosed in USB specification revision 2.0 released in 2000 by the USB Implementers Forum.
Figure 2:
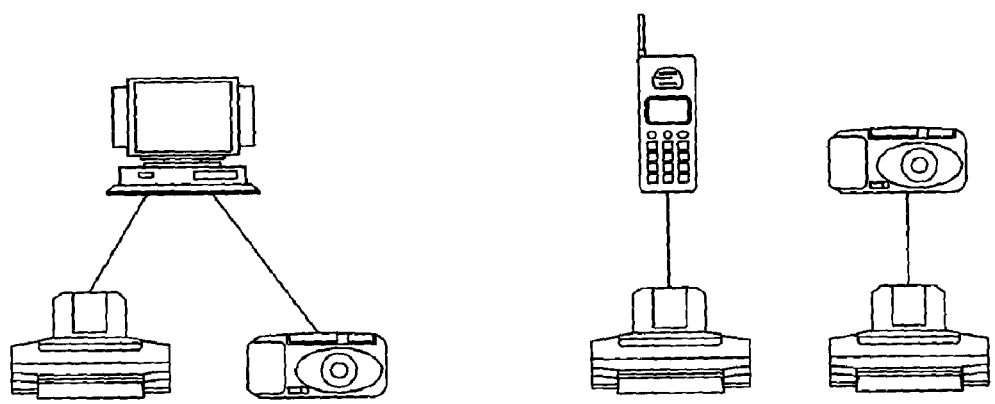
FIG. 2 illustrates a drawing of classes of the devices defined in USB OTG
Figure 3:
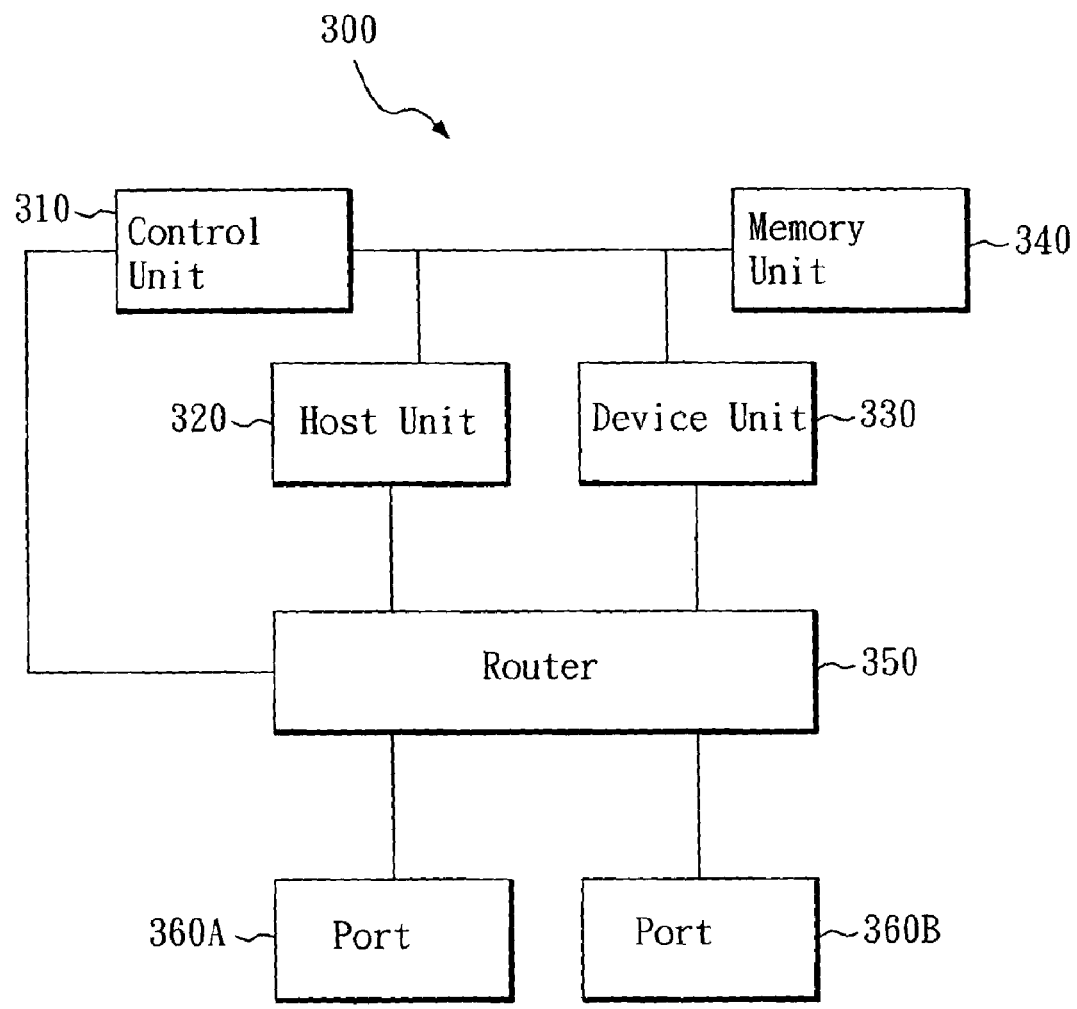
FIG. 3 is an exemplary diagram of a USB controlling interface with USB host/device function according to a preferred embodiment of the present invention.

Referring to FIG. 3, an exemplary diagram of a USB controlling interface with USB host/device function according to a preferred embodiment of the present invention is illustrated. The USB controlling interface 300 includes a control unit 310, a host unit 320, a device unit 330, a memory unit 340, a router 350 and a plurality of connecting ports 360A and 360B. The control unit 310 is connected to the host unit 320, the device unit 330, the memory unit 340 and the router 350 separately. The control unit 310 controls signal flows of the USB control interface, such as command signals, data signals and status signals, and transmits the signal flows to the host unit 320 and the device unit 330 according to states of connecting ports (e.g., states indicating a connecting port is an up stream port or a down stream port) defined by the control unit 310. The memory unit 340 stores the data needed for operation of the USB control unit. The router 350, connected to the connecting ports 360A and 360B, is used for coupling two kinds of connections among the connecting ports 360A and 360B, the device unit 330 and the host unit 320 in accordance with the states of connecting ports, such as an up stream port or a down stream port, defined by the control unit 310.

Differences between the up stream port and the down stream port are distinguished upon whether the external devices connected to the connecting ports supply power to the USB controlling interface 300 or not. When the external device supplies power to the USB controlling interface 300, the connecting port connected to the external device is defined as an up stream port and the external device is defined as an external host. When the external device does not supply power to the USB controlling interface 300, the connecting port connected to the external device is defined as a down stream port and the external device is defined as an external device. It is worth mentioning that the number of the connecting ports can be any assigned amount but not limited to the exact number disclosed in this embodiment. The host unit 320, connected to the control unit 310 and the router 350, connects with any of the connecting ports defined as a down stream port through the router 350 to couple to the external device. In this situation, the USB controlling interface is enabled as a host function. In addition, it is understood that description of the embodiments with one host unit is for easily describing, not limiting the embodiments of the present invention. The number of the host units in the present invention is to be broadly constructed to cover any particular amount. Alternately, a root hub can also be utilized to support the case that there is more than one port. Moreover, the device unit 330, connected to the control unit 310 and the router 350 separately, connects with any of the connecting ports defined as an up stream port through the router 350 to couple to the external host. In this situation, the USB controlling interface is enabled as a device function.

The task to define the connecting ports 360A and 360B as up stream ports or down stream ports is controlled by the control unit 310 via detecting upon whether the external equipments supply power to the USB controlling interface, and then the control unit 310 establishes connections bridging between the up stream port to the device unit 330 or the down stream port to the host unit 320 by controlling the router 350. The router 350 is only an optional element in this embodiment. For example, the connecting port 360A or 360B is directly bridged to the device unit 330 directly when it is an A type receptacle or a Mini-A type receptacle. On the other hand, the connecting port 360A or 360B is bridged to the host unit 320 directly when it is a B type receptacle or a Mini-B type receptacle. When the connecting port 360A or 360B is a Mini-AB receptacle, the USB controlling interface adds the router 350, the optional element mentioned above, to bridge the up stream port to the device unit 330 and the down stream port to the host unit 320 under the control of the control unit 310.

Figure 4:
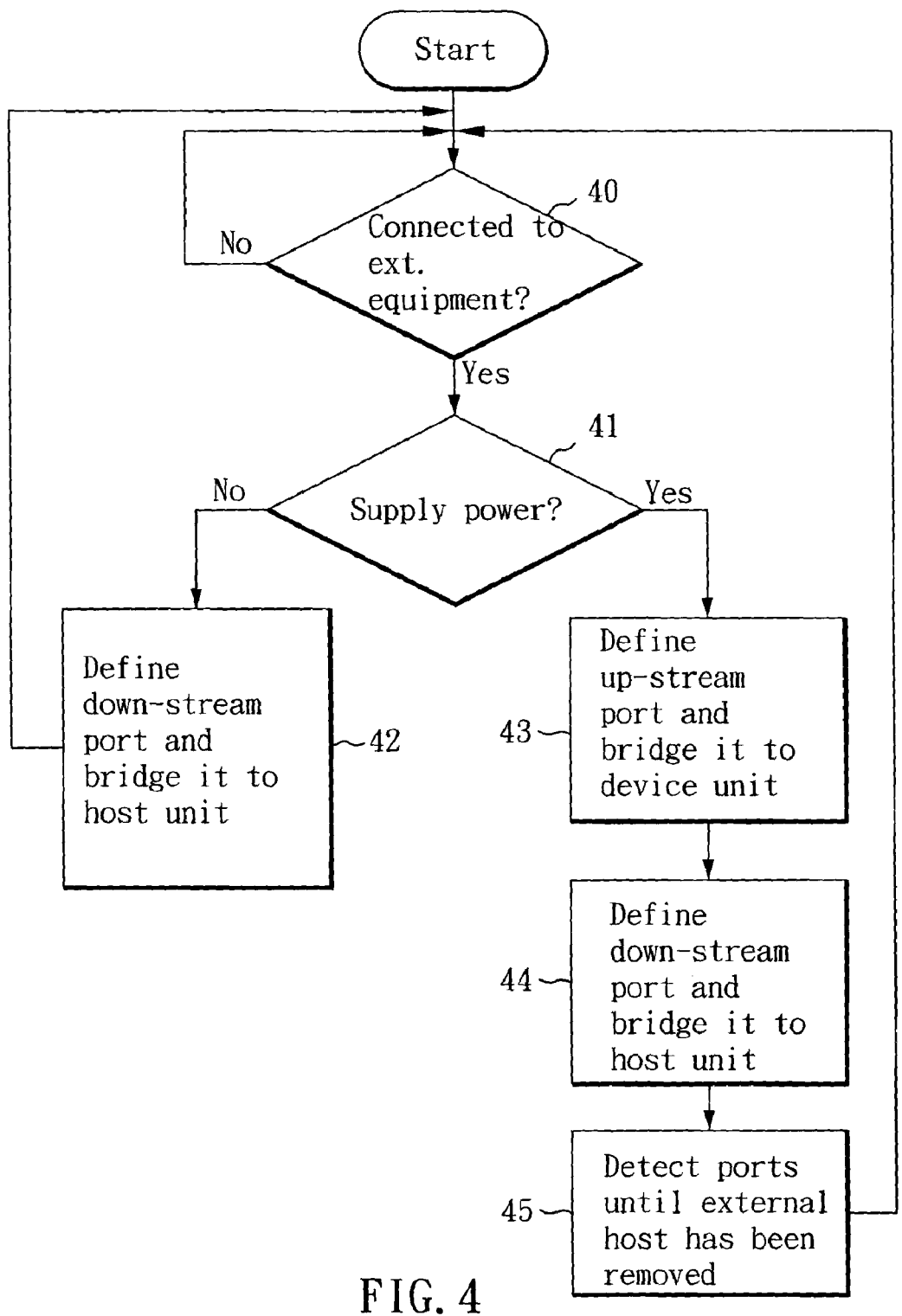
FIG. 4 is a schematic drawing of the control flow chart according to a preferred embodiment of the invention.

Referring to FIG. 4, a schematic drawing of the control flow chart according to a preferred embodiment of the invention is shown. In the step 40, the control unit 310 is utilized to detect whether the connecting port 360A or 360B is connected to any external equipment. When the connection between the connecting port and the external equipment exists, the step 41 detects whether the external equipment supplies power to the USB interface through the connecting ports. The step 42 utilizes the control unit 310 to define the connecting port connected with the external equipment as a down stream port and bridge the down stream port to the host unit 320 when the external equipment supplies no power to the USB interface. The step 43 utilizes the control unit 310 to define the connecting port connected with the external equipment as an up stream port and bridge the up stream port to the device unit 330 when the external equipment supplies power to the USB interface. After that, the step 44 defines the rest of the connecting port as a down stream port and bridges the down stream port to the host unit 320. The step 45 detects the states of the connecting ports continuously until the external host has been removed or another host is found to be connected to the connecting ports. In the later case, the second host will not be allowed to access the USB control interface.

Figure 5A:
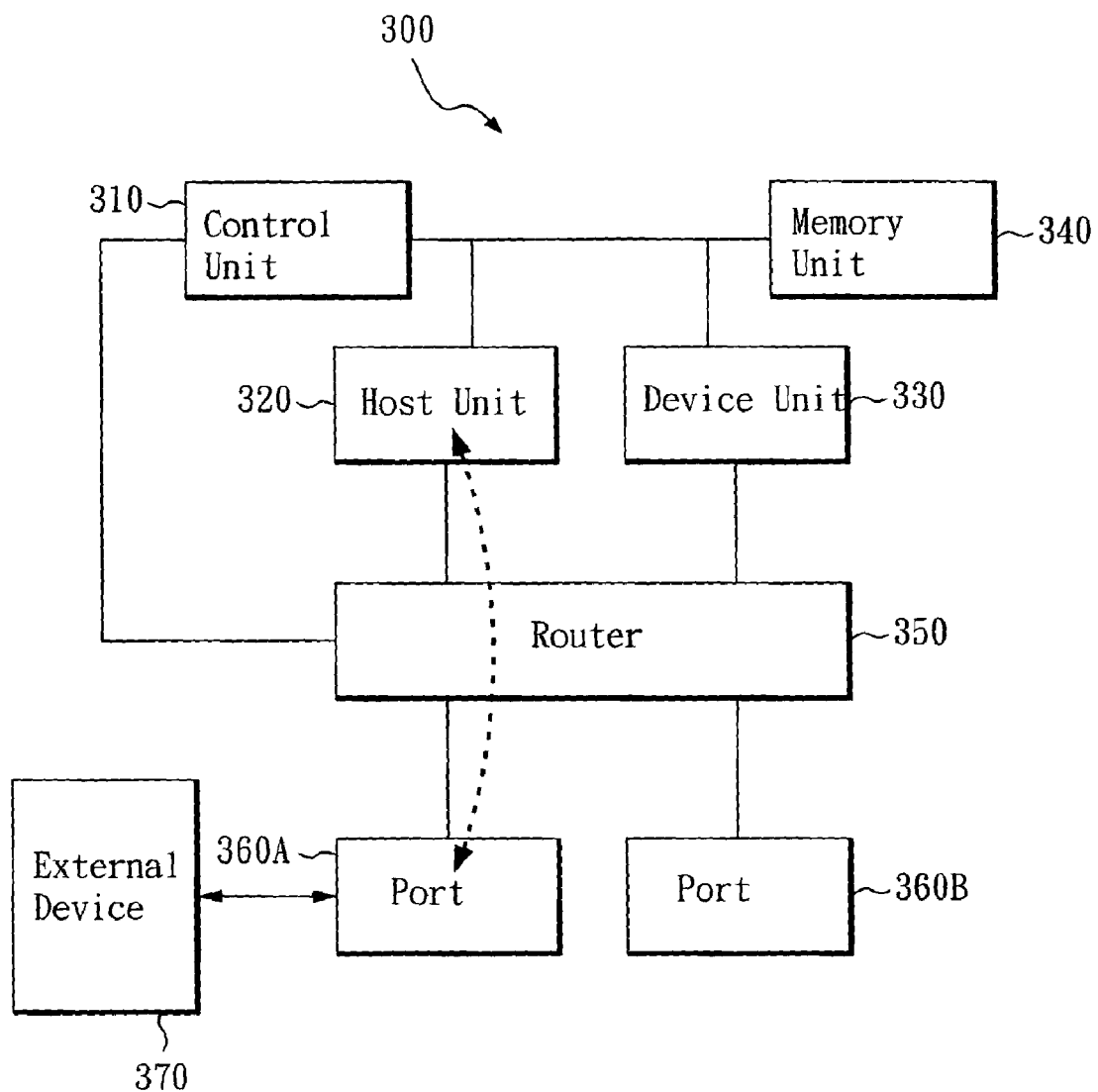
FIG. 5A is a diagram showing the operation function between the USB interface with host/device function and the external equipments in a stand alone mode when an external device is connected to a port 360A.
Figure 5B:
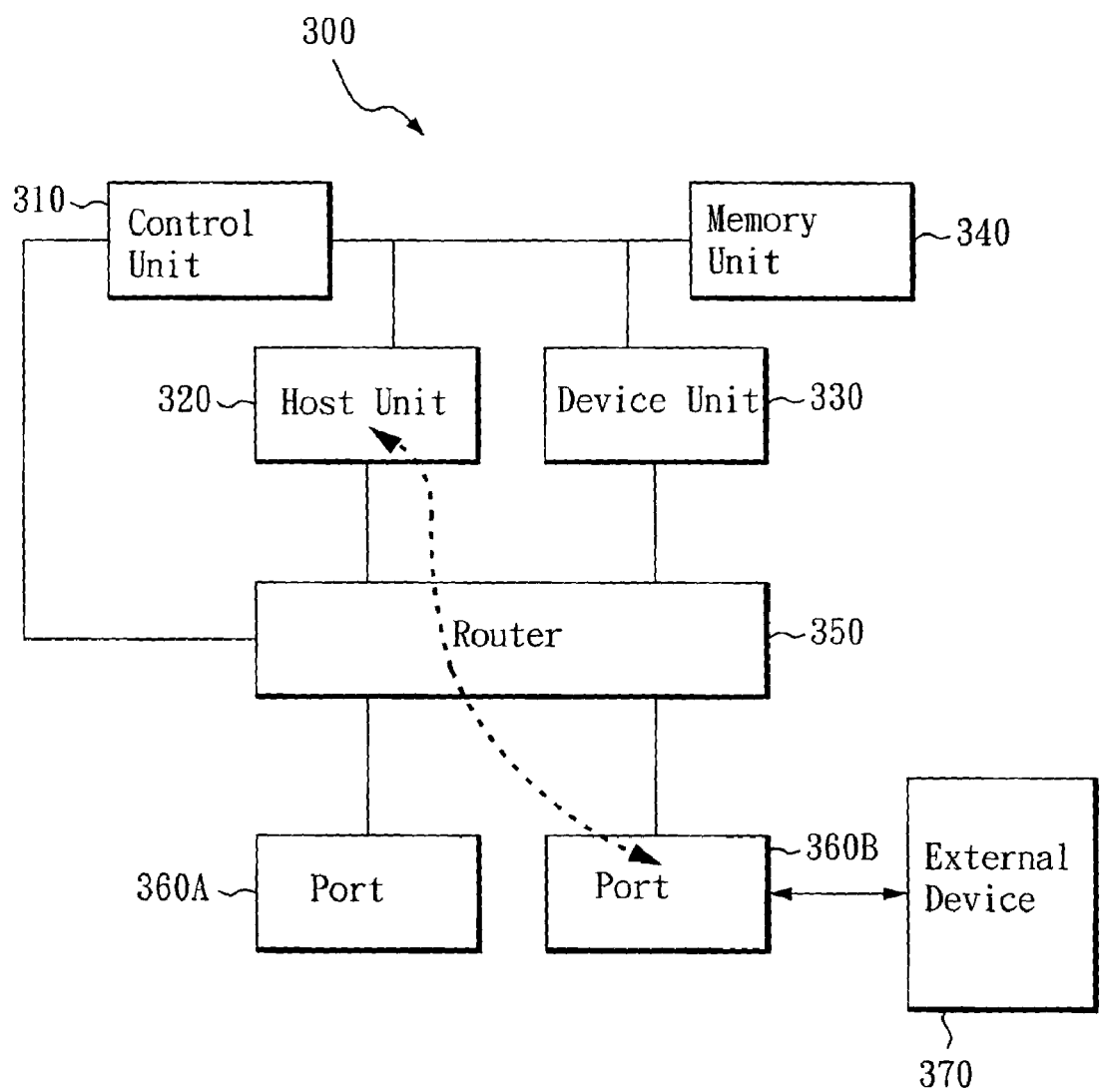
FIG. 5B is a diagram showing the operation function between the USB interface with host/device function and the external equipments in a stand alone mode when an external device is connected to a port 360B.

The below descriptions are used for describing the operation function between the USB interface with host/device function and the external equipments in different operation modes:

Referring to FIGS. 5A and 5B of the drawings, a diagram of the connecting relationship and operation function between the USB interface with host/device function and the external equipments in a stand alone mode is illustrated. In this embodiment, the connecting ports 360A or 360B are defined as a first connecting port and a second connecting port. In FIG. 5A, an external device 370 is connected to the first connecting port 360A. The first connecting port 360A is defined as a down stream port connected with the host unit 320 through the router 350 because the external device 370 supplies no power which is detected by the USB control interface 300. Therefore, the USB control interface 300 is able to use the functions of the external devices such as printing, scanning, accessing or playing data. In FIG. 5B, the external device 370 is connected to the second connecting port 360B. The second connecting port 360B is defined as a down stream port connected to the host unit 320 through the router 350 because the external device 370 supplies no power which is detected by the USB control interface 300. Therefore, the USB control interface 300 is able to use the functions of the external devices such as printing, scanning, accessing or playing data.

It can be shown from the working diagram of the USB interface 300 illustrated in FIG. 5A and FIG. 5B that the external device 370 connected to any of the connecting ports is able to be bridged to the host unit 320 such that the USB interface 300 is able to use the functions of the external device 370. Moreover, the stand-alone mode described above is sustained no matter the numbers of the connecting ports and the connecting ports connected with the external devices are changed or not.

Figure 6A:
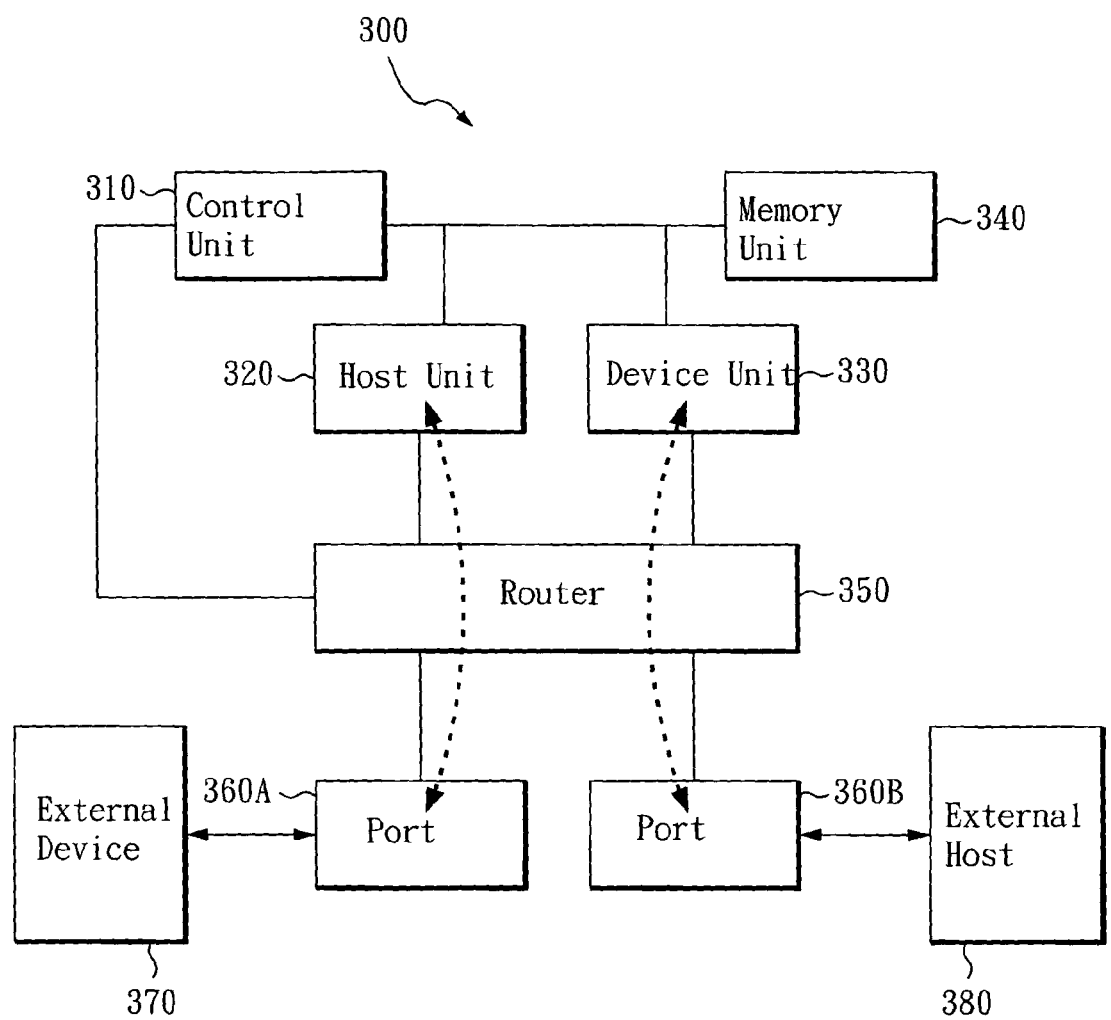
FIG. 6A is a diagram showing the operation function between the USB interface with host/device function and the external equipments in a device mode when an external host 380 is connected to a port 360B.
Figure 6B:
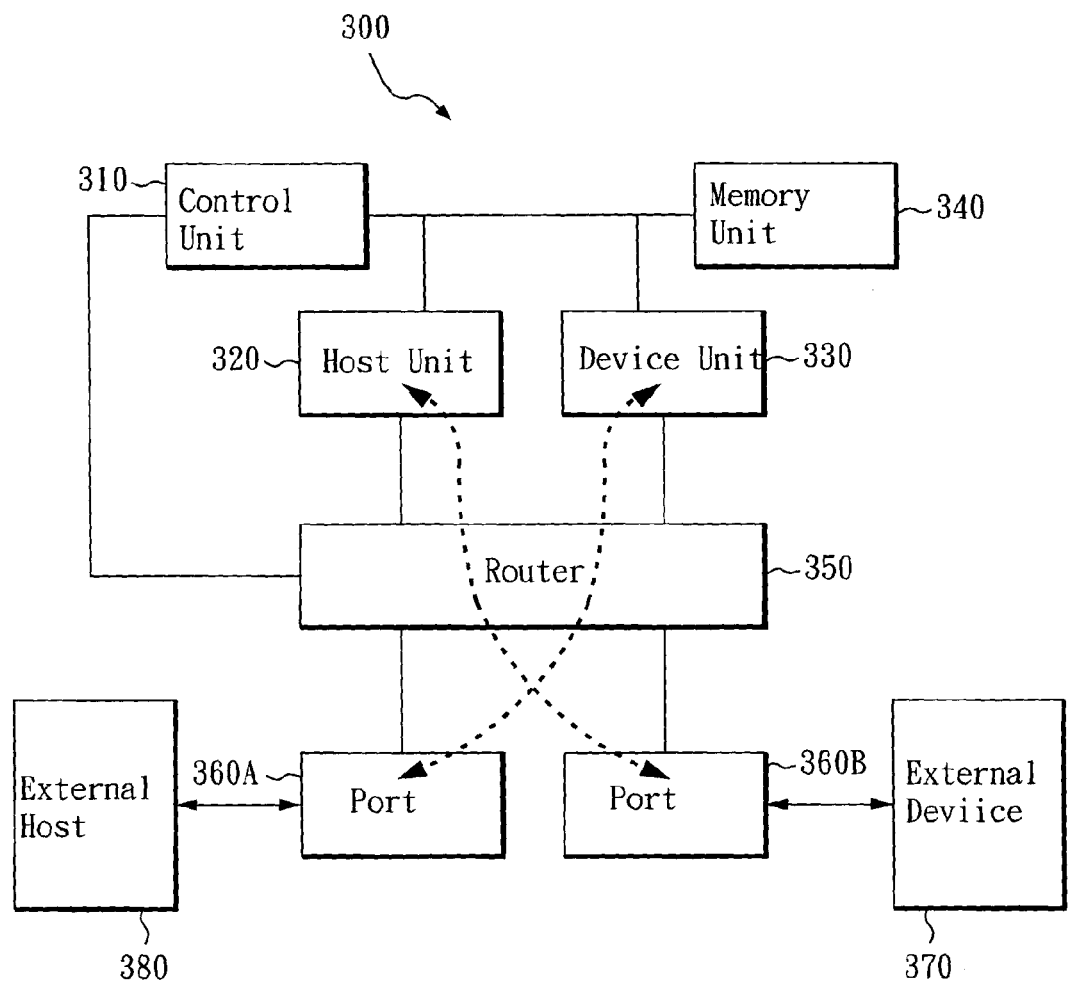
FIG. 6B is a diagram showing the operation function between the USB interface with host/device function and the external equipments in a device mode when an external host 380 is connected to a port 360A.

Referring to FIGS. 6A and 6B of the drawings, a diagram of the connecting relationship and operation function between the USB interface with host/device function and the external equipments under a device mode is illustrated. In FIG. 6A, an external host 380 is connected to the second connecting port 360B. The second connecting port 360B is defined as an up stream port connecting with the device unit 330 through the router 350 because the external host 380 supplies power which is detected by the USB control interface 300. As such, the control unit 310 defines the first connecting port as a down stream port connecting with the external device 370 which is bridged to the host unit 320 through the router 350. In this embodiment, the USB control interface 300 is defined as a composite device interface under the device mode but also not intended to be limiting. For example, the USB control interface 300 also can be defined as a compound device interface under the device mode.

In FIG. 6B, the external host 380 is connected to the first connecting port 360A. The first connecting port 360A is defined as an up stream port connecting with the device unit 330 through the router 350 because the external host 380 supplies power which is detected by the USB control interface 300, and the control unit 310 defines the second connecting port 360B as a down stream port connected with the external device 370 which is bridged to the host unit 320 through the router 350.

If the USB control interface according to the present invention is under the stand alone mode and an external host is connected to the connecting ports of the USB control interface 300, the USB control interface should turn into device mode. It's worth mentioning that the operation under the stand alone mode should be finished to make sure the correctness of the processing data.

The data accessing path and the data transmitting path are described below: the external host 380 connects with the router through the up stream port and communicates with the control unit 310 through the device unit 330. Thereafter, the control unit 310 accesses the information and data needed for the execution of the functions in the external device 380 by the host unit 320 and the down stream port and stores the data needed for operating and transmitting in the memory unit 340. On the basis of that, the USB control interface in accordance with the present invention is able to accomplish the bridge operations between the external host and the external device by the data path when the external host accesses the external device.

It is worth mentioning that one skilled in the art will understand that the embodiment of the present invention as shown in the drawings and described above is exemplary only and not intended to be limiting.

The host terminal is able to achieve the characteristic of hot plug in the USB interface by enumeration when the function executed by the external device is predefined in case of composite approach. At first, no matter what the USB control interface 300 is connected to an external device or not, at least one predefined function is booked when an external host is connected with the USB control interface 300. After that, when an external device with a predefined function is connected to the USB control interface 300, the predefined function is enabled to use the external device. For example, a removable disk function or a human interface function can be predefined so that the above functions can be used immediately when the external device with the predefined function plugged in soon after. It is also worth mentioning that the amounts and the classes of the predefined functions depend on the system request and efficacy which is exactly not limited to one function.

The other method to achieve the characteristic of hot plug in the USB interface is via designs of the USB control interface 300. When the USB control interface 300 and an external host are connected, the USB control interface 300 disconnects and re-connect with the external host automatically such that the external host is able to recognize the external device as one of its interfaces (a composite device) or one of its devices (a compound device) and identify and drive the external device after the existence of the external device are detected when another external device is connected with the external host through the USB control interface. Alternately, the USB interface can employ port status change of hub in case of compound approach to inform the external host of recognizing the external devices.

It is worth mentioning that the term "connect" is not limited to relate to wired connection or electrical connection. Any connecting method sustaining the requirements of signal transmission between each of the connecting units depended on the system should be regarded as disclosed by the present invention. For instance, the transmitting protocols in the Wireless USB specification also suit for the present invention.

In conclusion, the present invention provides a USB interface with host/device function which is able to construct a USB apparatus with host/device function by means of embedding with a functional circuit. In other word, by the use of present invention, any electronic device with USB interface, such as desktop computers, notebooks, minidisks, digital video player, cell phones, GPS equipments, PDA equipments and all kinds of inputting and outputting devices, are able to be integrated as a USB apparatus with USB host/device function so that the USB apparatus is not only able to use devices, but also allows an external host to connect with other external devices for using functions of the external devices directly without changing the connections among the external devices, the external host and the USB apparatus. Therefore, by the use of the present invention, each of said electronic devices is able to turn into a USB apparatus with USB host/device function having extremely compatibility and applicability which raises the values of said electronic devices significantly.

One skilled in the art will understand that the embodiment of the present invention as shown in the drawings and described above is exemplary only and not intended to be limiting.

The foregoing description of the preferred embodiment of the present invention has been presented for purposes of illustration and description. It is not intended to be exhaustive or to limit the invention to the precise form or to exemplary embodiments disclosed. Accordingly, the foregoing description should be regarded as illustrative rather than restrictive.

Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An apparatus comprising:
   a first reversible port operating in either an up-stream mode or a down-stream mode;
   a second reversible port operating in either said up-stream mode or said down-stream mode;
   a control unit configuring said first reversible port to operate in said up-stream mode when said control unit detects a first external equipment connecting to said first reversible port and providing power to said first reversible port, and configuring said second reversible port to operate in said down-stream mode when said control unit detects a second external equipment connecting to said second reversible port;
   a host unit coupled to said second external equipment through said second reversible port; and
   a device unit coupled to said first external equipment through said first reversible port.

2. The apparatus as claimed in claim 1, further comprising a router coupled to said control unit, said host unit, and said down-stream port, wherein said router bridges said host unit to said second reversible port.

3. The apparatus as claimed in claim 2, wherein the router further bridges said device unit to said first reversible port.

4. The apparatus as claimed in claim 1, further comprising a memory unit coupled to said control unit, said host unit, and said device unit for storing data.

5. The apparatus as claimed in claim 1, wherein one predefined function is booked when said first external equipment is connected with said first reversible port.

6. The apparatus as claimed in claim 5, wherein said one predefined function comprises a removable disk function.

7. The apparatus as claimed in claim 5, wherein said one predefined function comprises a human interface function.

8. The apparatus as claimed in claim 1, wherein said apparatus functions as a composite device.

9. The apparatus as claimed in claim 1, wherein said apparatus functions as a compound device.

10. A method of controlling an interfacing apparatus with a reversible port, a control unit, a host unit, and device unit; the method comprising:
    detecting that external equipment is connected to said reversible port;
    configuring said reversible port to operate in an up-stream mode if said external equipment provides power to said reversible port by said host unit;
    configuring said reversible port to operate in a down-stream mode if said external equipment does not provide power to said reversible port by said host unit;
    bridging said host unit to said reversible port if said reversible port is operating in said down-stream mode;
    bridging said device unit to said reversible port if said reversible port is operating in said up-stream mode; and
    detecting if said external equipment becomes disconnected from said reversible port.

11. The method as claimed in claim 10, further comprising blocking a predefined function when said reversible port operates under said up-stream mode.

12. The method as claimed in claim 11, wherein said predefined function is a removable disk function.

13. The method as claimed in claim 11, wherein said predefined function is a human interface function.

14. The method as claimed in claim 10, wherein said interfacing apparatus functions as a composite device.

15. The method as claimed in claim 10, wherein said interfacing apparatus functions as a compound device.

* * * * *